United States Patent
Cunney et al.

(10) Patent No.: US 11,823,331 B2
(45) Date of Patent: Nov. 21, 2023

(54) SELF DRAWING TOOL FOR A COMPUTER-IMPLEMENTED AUTOMATED DESIGN, MODELING AND MANUFACTURING SYSTEM

(71) Applicant: Mechanical Software Technologies, Inc., Meadville, PA (US)

(72) Inventors: Brendan Cunney, Blauvelt, NY (US); Michael Cunney, Pearl River, NY (US); Shaun Cunney, West Nyack, NY (US); Keith Pedrick, Saddle Brook, NJ (US); Joshua Whitman, Meadville, PA (US)

(73) Assignee: MECHANICAL SOFTWARE TECHNOLOGIES, INC., Meadville, PA (US)

( * ) Notice: Subject to any disclaimer, the term of this patent is extended or adjusted under 35 U.S.C. 154(b) by 119 days.

(21) Appl. No.: 16/950,785

(22) Filed: Nov. 17, 2020

(65) Prior Publication Data
US 2021/0209852 A1 Jul. 8, 2021

Related U.S. Application Data

(63) Continuation of application No. 16/522,470, filed on Jul. 25, 2019, now Pat. No. 11,182,956, which is a (Continued)

(51) Int. Cl.
*G06T 19/00* (2011.01)
*G05B 19/4093* (2006.01)

(52) U.S. Cl.
CPC .......... *G06T 19/00* (2013.01); *G05B 19/4093* (2013.01)

(58) Field of Classification Search
None
See application file for complete search history.

(56) References Cited

U.S. PATENT DOCUMENTS 6,813,610 B1 11/2004 Bienias
6,922,701 B1 7/2005 Ananian et al.
(Continued)

OTHER PUBLICATIONS

B. Cheng and Y. Song, "Using Parametric Modeling to Improve the Equipment Systems Coordination Process for Buildings," 2010 International Conference on Management and Service Science, Wuhan, China, Aug. 2010, pp. 1-4, doi: 10.1109/ICMSS.2010.5577740. (Year: 2010).*

*Primary Examiner* — Ryan A Jarrett
(74) *Attorney, Agent, or Firm* — Merchant & Gould P.C.

(57) ABSTRACT

A method and system for automatically generating a coordination drawing of a project is disclosed. In one embodiment, a method includes inputting parametric information, and accessing a file associated with a schematic drawing of a project and identifying a plurality of elements in the schematic drawing from the file. The method further includes obtaining geometrical and connectivity information associated with each of the plurality of elements by analyzing each of the plurality of elements. Additionally, the method includes selecting one or more predefined objects from a spatial database based on the geometrical and connectivity information associated with each of the plurality of elements and the inputted parametric information. The method further includes automatically generating a coordination drawing of the project using the one or more predefined objects, wherein the coordination drawing provides routing information of the plurality of elements in the project.

18 Claims, 4 Drawing Sheets

Related U.S. Application Data continuation of application No. 15/436,465, filed on Feb. 17, 2017, now Pat. No. 10,410,415, which is a continuation of application No. 13/271,634, filed on Oct. 12, 2011, now Pat. No. 9,613,458, which is a continuation-in-part of application No. 12/783,573, filed on May 20, 2010, now Pat. No. 10,254,745, and a continuation of application No. 13/105,626, filed on May 11, 2011, now abandoned.

(56) References Cited

U.S. PATENT DOCUMENTS

| | | |
|---|---|---|
| 6,968,298 B2 | 11/2005 | Lohmann et al. |
| 7,249,250 B1 | 7/2007 | Akasaka et al. |
| 8,266,005 B2 | 9/2012 | Lopez et al. |
| 9,613,458 B2 | 4/2017 | Cunney et al. |
| 2005/0038636 A1 | 2/2005 | Wakelam et al. |
| 2007/0107366 A1* | 5/2007 | Franco ................ E04C 3/32 |
| | | 52/848 |
| 2007/0198231 A1 | 8/2007 | Walch |
| 2008/0021823 A1 | 1/2008 | Allin et al. |
| 2009/0033656 A1 | 2/2009 | Larkins et al. |

* cited by examiner

SELF DRAWING TOOL FOR A COMPUTER-IMPLEMENTED AUTOMATED DESIGN, MODELING AND MANUFACTURING SYSTEM

RELATED APPLICATION

This application is a Continuation of U.S. Ser. No. 16/522,470 filed on 25 Jul. 2019, U.S. Pat. No. 11,182,956, which is a Continuation of U.S. Ser. No. 15/436,465 filed on 17 Feb. 2017, U.S. Pat. No. 10,410,415, which is a Continuation of U.S. Ser. No. 13/271,634 filed on 12 Oct. 2011, U.S. Pat. No. 9,613,458, which is a Continuation-In-Part of U.S. Ser. No. 12/783,573 filed on 20 May 2010, U.S. Pat. No. 10,254,745, and a Continuation of U.S. Ser. No. 13/105,626 filed on 11 May 2011, the disclosures of which are incorporated by reference in their entireties. To the extent appropriate a claim of priority is made to each of the above-listed applications.

BACKGROUND OF THE INVENTION

Field of Technology

The present disclosure relates to a computer-implemented automated design, modeling, and manufacturing system, and more particularly relates to a self drawing tool for a computer-implemented automated design, modeling, and manufacturing system.

SUMMARY OF THE PRIOR ART

Typically, in designing a construction project, a design engineer uses traditional drafting and computer-aided drafting tools to manually create a coordination drawing of the project. As an input, the design engineer may be provided with a schematic drawing showing the various mechanical systems and their interconnection. In such case, the design engineer may have to manually determine wall, floor and trade elements to route the mechanical elements through the wall, floor and other trade elements based on load and use information like heat load, electrical use, number of occupants and water requirements. This may be time consuming process and may be error prone. In other words, traditional drafting and computer-aided drafting ("CAD") techniques only serve to disseminate all of the information involved in designing and detailing a project and are time-consuming processes that require a high-level of interdisciplinary communication and management between design engineers, product engineers and contractors.

SUMMARY OF THE INVENTION

This summary is provided to comply with 37 C.F.R. § 1.73, requiring a summary of the invention briefly indicating the nature and substance of the invention. It is submitted with the understanding that it will not be used to interpret or limit the scope or meaning of the claims.

A self drawing tool of a computer-implemented automated design, modelling and manufacturing system is disclosed. In one aspect, a method includes inputting parametric information, and accessing a file associated with a schematic drawing of a project and identifying a plurality of elements in the schematic drawing from the file. The method further includes obtaining geometrical and connectivity information associated with each of the plurality of elements by analyzing each of the plurality of elements. Additionally, the method includes selecting one or more predefined objects from a spatial database based on the geometrical and connectivity information associated with each of the plurality of elements and the inputted parametric information. The method further includes automatically generating a co-ordination drawing of the project using the one or more predefined objects, wherein the coordination drawing provides routing information of the plurality of elements in the project.

The method may include checking conflicts between the plurality of elements and structural, architectural and trade elements in the coordination drawing and resolving Conflicts between the plurality of elements and the structural, architectural and trade elements. Moreover, the method may include outputting the co-ordination drawing to a computer implemented manufacturing system or project management and accounting system.

In another aspect, a non-transitory computer-readable storage medium having instructions that, when executed by a computing platform, causes the computing platform to perform a method described above.

In yet another aspect, a computer-implemented automated design, modeling and manufacturing system includes a means for inputting parametric information, a spatial database comprising one or more predefined objects, a processor, and memory coupled to the processor. The memory includes a self-drawing tool including a file reader module for accessing a file associated with a schematic drawing of a project and identifying a plurality of elements in the schematic drawing from the file.

The self drawing tool also includes an element analyzer for obtaining geometrical and connectivity information associated with each of the plurality of elements by analyzing each of the plurality of elements. Furthermore, the self drawing tool includes a self draw module for selecting the one or more predefined objects from the spatial database based on the geometrical and connectivity information associated with each of the plurality of elements and the inputted parametric information. Moreover, the self drawing tool includes a co-ordination drawing generator for automatically generating a co-ordination drawing of the project using the one or more predefined objects, where the coordination drawing provides routing information of the plurality of elements in the project.

In further another aspect, a network system for generating a co-ordination drawing of a project includes a plurality of client devices for providing a schematic drawing of the project and parametric information and for generating a request for a co-ordination drawing using the schematic drawing of the project. The network system also includes a plurality of database servers having a spatial database storing predefined objects, where each of the plurality of design databases stores one or more predefined objects. Furthermore, the network system includes a plurality of application servers for selecting the one or more predefined objects based on the parametric information and for automatically generating a co-ordination drawing of the project for a computer-aided design (CAD) standard platform based on the one or more predefined objects, and a coordination drawing database for storing the co-ordination drawing of the project.

Other features of the embodiments will be apparent from the accompanying drawings and from the detailed description that follows.

BRIEF DESCRIPTION OF THE VIEWS OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION OF A PREFERRED EMBODIMENT

A self drawing tool of a computer-implemented automated design, modelling and manufacturing system is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
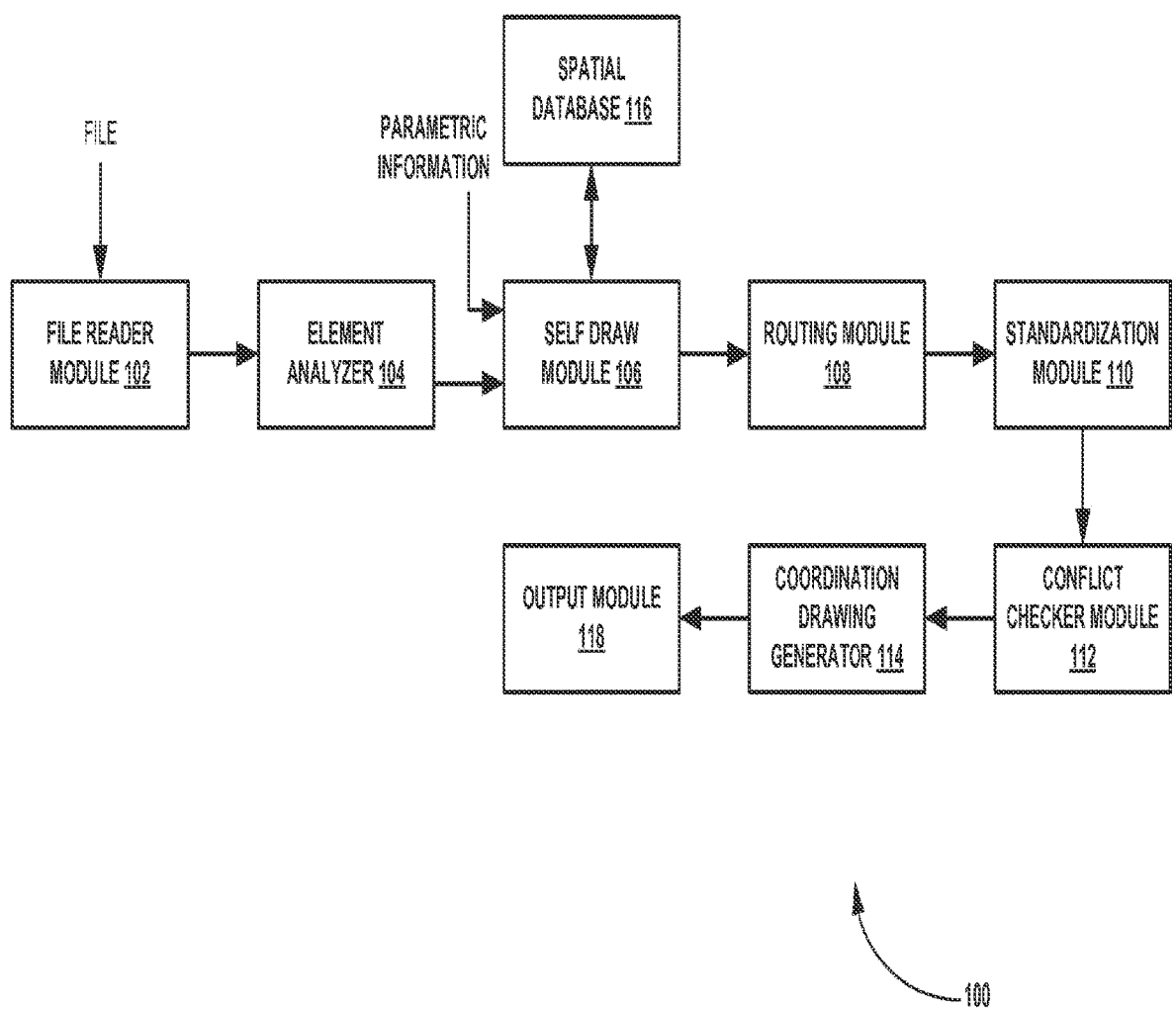
FIG. 1 is a block diagram of a self drawing tool for a computer-implemented automated design, modeling and manufacturing system, according to one embodiment.

FIG. 1 is a block diagram of a self drawing tool 100 for a computer-implemented automated design, modeling and manufacturing system, according to one embodiment. The self drawing tool 100 includes a file reader module 102, an element analyzer 104, a self draw module 106, a routing module 108, a standardization module 110, a conflict checker module 112, a coordination drawing generator 114, and an output module 118.

Figure 2:
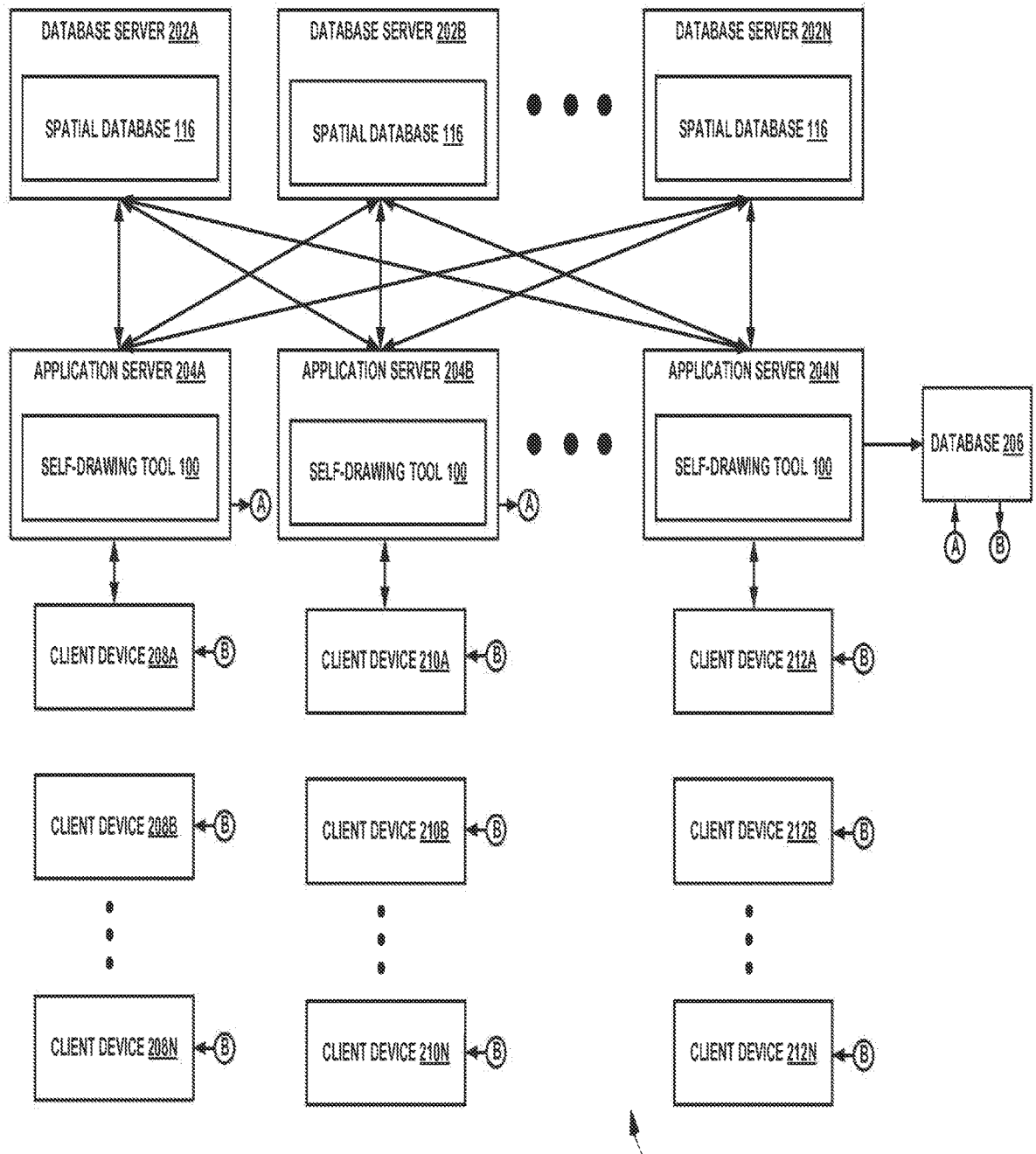
FIG. 2 illustrates a block diagram of an exemplary network system employing a self drawing module for generating a coordination drawing from a schematic drawing of a project, according to one embodiment.
Figure 3:
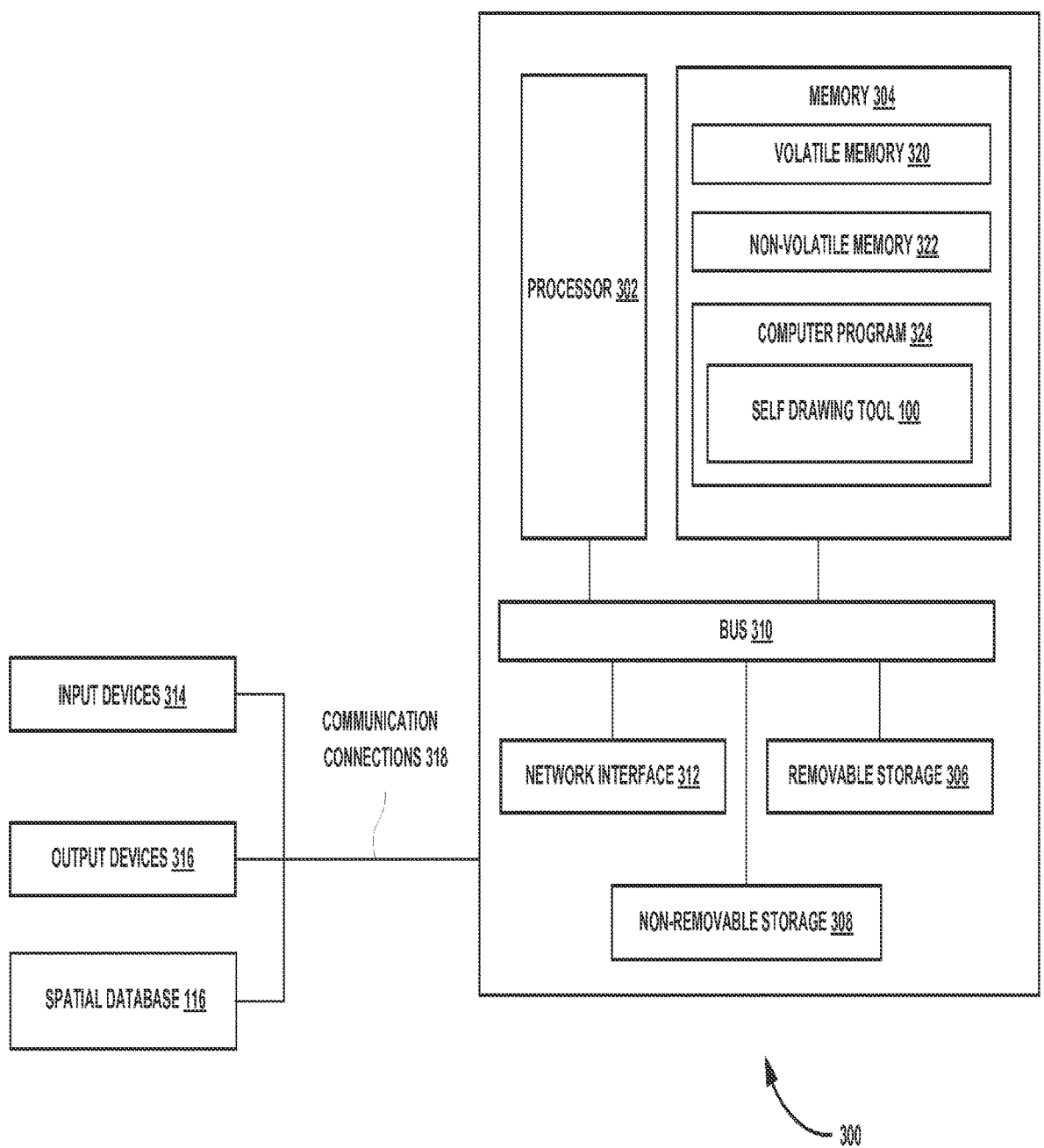
FIG. 3 shows an example of a computing device for implementing one or more embodiments of the present subject matter.

In some embodiments, the self drawing tool 100 of the computer-implemented automated design, modeling and manufacturing system may reside in a computing environment as illustrated in FIGS. 2 and 3. The computing environment includes a single Computer, (e.g., a desktop personal computer, a laptop, or a workstation). Alternatively, the self drawing module 100 may be implemented on a network of such computers, in which case the computing environment includes one or more servers and a plurality of computers connected thereto in a conventional fashion via network connections. In these embodiments, the self drawing Module 100 enables a user to generate routing mechanical elements in a project and bill of material required for the project.

In an exemplary operation, the user provides a schematic drawing associated with the project to the self drawing tool. The schematic drawing May be stored in a database as a computer readable file. The file reader module 102 accesses the file associated with the schematic drawing from the database and identifies elements in the schematic drawing from the file. For example, the file reader module 102 may determine Mechanical systems (e.g., pipes, fittings, ductwork, equipment, etc.) in the schematic drawing by reading the file. Then, the element analyzer 104 analyzes each of the elements to obtain geometrical and connectivity information associated with each of the elements. For example, the element analyzer 104 may determine wall/floor elements and locations where mechanical systems may pass through the wall/floor elements in a schematic drawing.

Accordingly, the self draw module 106 connects to a spatial database 116 having predefined objects (e.g., airducts, pipes, wires and other mechanical system objects) and fetches desired ones of the predefined objects from the spatial database 116 based on the geometrical and connectivity information of the elements. Also, the self draw module 106 may consider parametric information inputted by a user by a computer operator or via an optical reader or computer file reader for selecting the predefined objects from the spatial database. Exemplary parametric objects may include structural constraints, heating requirements, ventilation requirements, water requirements, electrical requirements, and occupancy requirements associated with the project.

The routing module 108 then determines clearances between each element and elements in its close proximity by analyzing structural, architectural, and trade elements in close proximity to the each element based on the geometrical and connectivity information of said each element. Accordingly, the routing module 108 connects each element with elements in its close proximity using the connectivity information and routes the elements using the fetched predefined objects. For example, the routing module 108 may resize one or more elements in the schematic drawings based on the clearance information and then route the elements through the wall/floor elements.

Substantially simultaneously, the standardization module 110 applies a set of standards to the routed elements. Once the elements are routed, the conflict checking module 112 checks whether there are any conflicts between the routed elements and structural, architectural and trade elements. In one embodiment, the conflict checking module 112 resolves the conflicts (if found) between the elements and the structural, architectural and trade elements. For example, the conflict checking module 112 resolves Conflicts by redirecting the elements in most efficient manner to avoid the conflicts. In another embodiment, the conflict checking module 112 may prompt the user to resolve the conflicts if user intervention is required. For example, the conflict checking module 112 flags any potential conflicts determined in the routed elements and highlights potential conflicts and potential solutions for assisting a user in determining a resolution. The user may select from the potential solutions or may create a different solution.

Finally, the coordination drawing generator 114 generates a coordination drawing of the schematic diagram. The coordination drawing thus generated provides routing information of the elements in the schematic drawing and also bill of materials associated with the schematic drawing. The output module 118 outputs the co-ordination drawing to a computer implemented manufacturing system or a project management and accounting system. For example, the coordination drawing shows routing of the elements through the wall/floor elements of the schematic drawing which is used for installation of elements in the project. Also, the coordination drawing contains a bill of materials for accounting, cost analysis, project budget, quoting, and CAD manufacture of producible items. The computer implemented manufacturing system may include plasma machines, coil lines, pipe cutting machines, etc.

FIG. 2 illustrates a block diagram of an exemplary network system 200 employing a self drawing module for generating a coordination drawing from a schematic drawing of a project, according to one embodiment. The network system 200 includes database servers 202A-N, application servers 204A-N and a coordination drawing database 205. As illustrated, the spatial database 116 resides in the database servers 202A-N, respectively. Further, the self drawing tool 100 resides in each of the application servers 204A-N, The network system 200 includes client devices 208A-N, client devices 210A-N and client devices 212A-N. For example, each client device may be a workstation, a desktop, and a laptop.

In FIG. 2, each of the application servers 204A-N is coupled to the database servers 202A-N. Also, said each of the application servers 204A-N is coupled to the coordination drawing database 206. Further, the client devices 208A-N, the client devices 210A-N and the client devices 212A-N are coupled to the application server 204A, the application server 204B and the application server 204N, respectively. Also, the client devices 208A-N, the client devices 210A-N and the client devices 212A-N are coupled to the coordination drawing database 206.

In one exemplary implementation, the network system 200 is operable for generating a coordination drawing of a project. For example, consider that, a client device 208A makes a request for a coordination drawing of a project to the application server 204A. In such scenario, the self drawing tool 100 in the application server 204A access a file associated with the schematic drawing from the database server 202A and identifies elements in the schematic drawing. The self drawing tool 100 then obtains geometrical and connectivity information of the elements. Further, the self drawing tool 100 utilizes the geometrical and connectivity information along with parametric objects to select predefined objects from the spatial database 116. Accordingly, the self drawing tool 100 routes the elements through the structural, architectural and trade elements and generates a coordination drawing of the project using the predefined objects. The application server 204A thus stores the coordination drawing in the coordination drawing database 206 as well it is provided to the client device 204A as per the request.

FIG. 3 shows an example of a computing device 300 for implementing one or more embodiments of the present subject matter. FIG. 3 and the following discussion are intended to provide a brief, general description of the suitable computing environment in which certain embodiments of the inventive concepts contained herein may be implemented.

The computing device 300 may include a processor 302, memory 304, a removable storage 306, and a non-removable storage 308. The computing device 300 additionally includes a bus 310 and a network interface 312. The computing device 300 may include or have access to one or more user input devices 314, one or more output devices 316, the spatial database 116 and one or more communication connections 318 such as a network interface card or a universal serial bus connection. The one or more user input devices 314 may be keyboard, mouse, optical reader, file reader and the like. The one or more output devices 316 may be a display of the computing device 300. The spatial database 116 may include predefined objects such as ducts, wires and other mechanical objects useful for generating a coordination drawing. The communication connections 318 may include a wireless communication network such as wireless local area network, local area network and the like.

The memory 304 may include volatile memory 320 and non-volatile memory 322. A variety of computer-readable storage media may be stored in and accessed from the memory elements of the computing device 300, such as the volatile memory 320 and the non-volatile memory 322, the removable storage 306 and the non-removable storage 308, Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts, Machine-readable instructions stored on any of the above-mentioned storage media may be executable by the processor 302 of the computing device 300. For example, a computer program 324 may include machine-readable instructions capable of coordination drawing of a project from a schematic drawing of the project, according to the teachings and herein described embodiments of the present subject matter. In one embodiment, the computer program 424 may include the self drawing tool 100 for generating a coordination drawing of a project with routing of mechanical systems through structural, architectural and trade elements in the project. The computer program 324 may be included on a compact disk-read only memory (CD-ROM) and loaded from the CD-ROM to a hard drive in the non-volatile memory 322. The machine-readable instructions may cause the computing device 300 to encode according to the various embodiments of the present subject matter.

Figure 4:
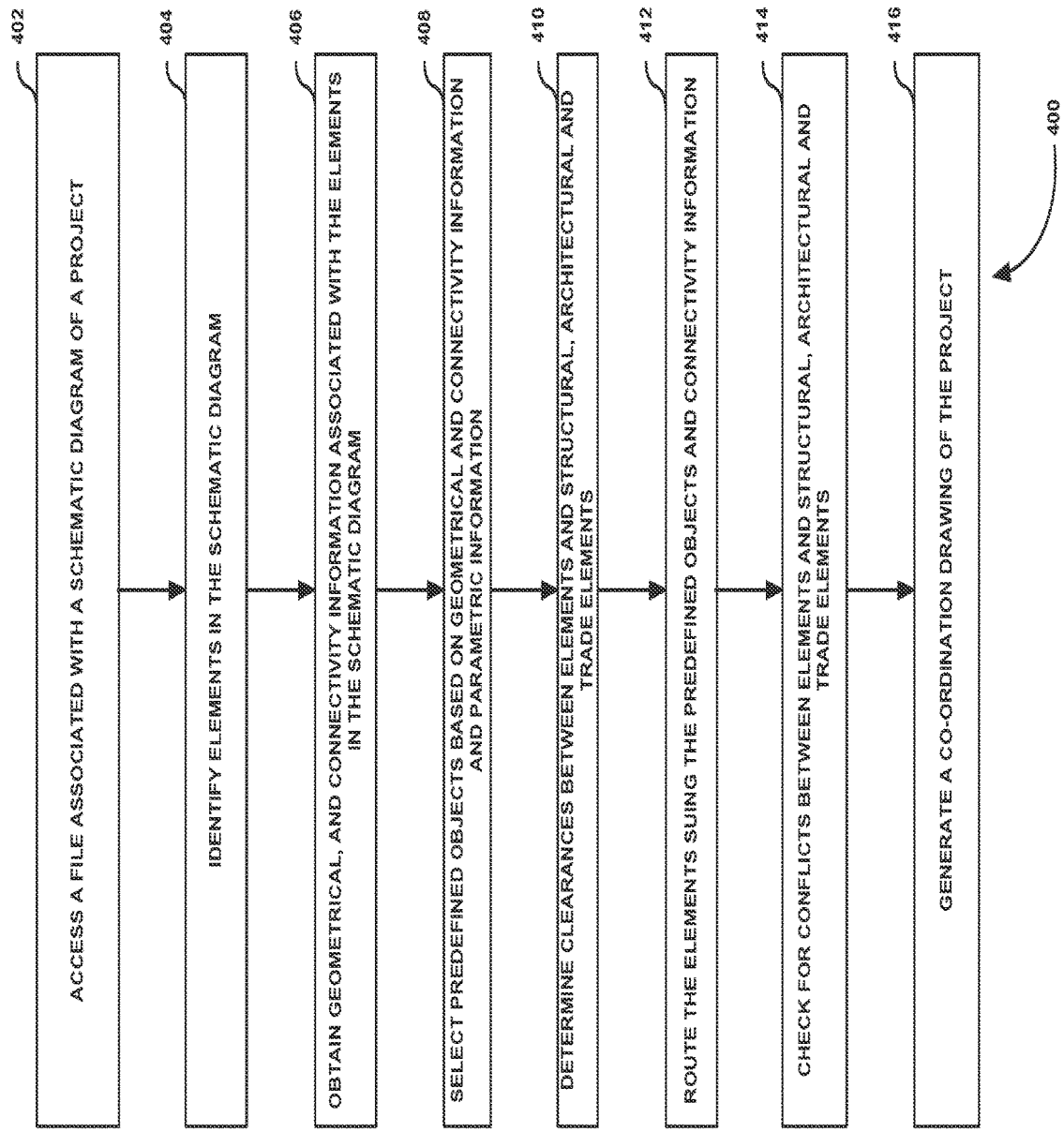
FIG. 4 is a process flowchart of an exemplary method of generating a coordination drawing of a project from a schematic drawing of the project, according to one embodiment.

FIG. 4 is a process flowchart 400 of an exemplary method of generating a coordination drawing of a project from a schematic drawing of the project, according to one embodiment. At step 402, a file associated with a schematic drawing of a project is accessed. At step 404, elements in the schematic drawing are identified by reading the file. At step 406, geometrical and connectivity information associated with each of the elements in the project are obtained by analyzing each of the elements. At step 408, one or more predefined objects are selected from a spatial database based on the geometrical and connectivity information of the elements and parametric information inputted by a user.

At step 410, clearances between elements and structural, architectural, and trade elements in the project are determined. At step 412, the elements are routed through the structural, architectural and trade elements based on the clearances using the predefined objects. At step 414, conflicts between any elements and structural, architectural and trade elements are determined and resolved. At step 416, a coordination drawing of the project is generated. Moreover, in one embodiment, a non-transitory computer-readable storage medium having instructions that, when executed by the self drawing tool 100, causes the self drawing tool 100 to perform a method described in FIG. 4.

A skilled person will recognize that many suitable designs of the systems and processes may be substituted for or used in addition to the configurations described above. It should be understood that the implementation of other variations and modifications of the embodiments of the invention and its various aspects will be apparent to one ordinarily skilled in the art, and that the invention is not limited by the exemplary embodiments described herein and in the claims. Therefore, it is contemplated to cover the present embodiments of the invention and any and all modifications, variations, or equivalents that fall within the true spirit and scope of the basic underlying principles disclosed and claimed herein.

What is claimed is:

1. A computer-implemented automated design, modeling and manufacturing system, comprising:
   at least one processor; and
   a non-transitory computer-readable storage medium having instructions that, when executed by the processor, cause the system to:
      receive a schematic drawing of a construction project;
      identify a plurality of elements in the schematic drawing, including identify a pipe or ductwork in the schematic drawing and a wall or a floor in the schematic drawing, and identify a location where the pipe or the ductwork passes through the wall or the floor;
      receive parametric information associated with the project, the parametric information including one or more of: structural constraints, heating requirements, ventilation requirements, water requirements, electrical requirements, and occupancy requirements associated with the project; and
      generate, using the elements and the parametric information, a coordination drawing of the project, the coordination drawing showing routing of the elements based on the parametric information, including routing, based on the parametric information, one of the elements through another one of the elements.

2. The system of claim 1, wherein the generated coordinated drawing includes a bill of materials associated with the schematic drawing.

3. The system of claim 2, further comprising a manufacturing machine for manufacturing one or more of the elements.

4. The system of claim 3, wherein the manufacturing machine includes one of a plasma machine or a pipe cutting machine.

5. The system of claim 4, wherein the manufacturing machine uses the bill of materials to produce an item for the project.

6. The system of claim 1, wherein the generated coordination drawing shows routing of the elements through the wall or the floor.

7. The system of claim 1, wherein the generate includes to resize one of the elements based on the parametric information.

8. The system of claim 1, wherein the generate includes to determine a clearance between two of the elements, and wherein the routing one of the elements through another one of the elements is based on the clearance.

9. The system of claim 1, wherein the generate includes to apply a set of standards to the plurality of elements.

10. A computer-implemented method, comprising:
    receiving a schematic drawing of a construction project;
    identifying a plurality of elements in the schematic drawing, including identifying a pipe or ductwork in the schematic drawing and a wall or a floor in the schematic drawing, and identifying a location where the pipe or the ductwork passes through the wall or the floor;
    receiving parametric information associated with the project, the parametric information including one or more of: structural constraints, heating requirements, ventilation requirements, water requirements, electrical requirements, and occupancy requirements associated with the project; and
    generating, using the elements and the parametric information, a coordination drawing of the project, the coordination drawing showing routing of the elements based on the parametric information, including routing, based on the parametric information, one of the elements through another one of the elements.

11. The method of claim 10, wherein the generated coordinated drawing includes a bill of materials associated with the schematic drawing.

12. The method of claim 11, further comprising manufacturing one or more of the elements.

13. The method of claim 12, wherein the manufacturing is performed with a plasma machine or a pipe cutting machine.

14. The method of claim 13, wherein the manufacturing includes using the bill of materials to produce an item for the project.

15. The method of claim 10, wherein the generated coordination drawing shows routing of the elements through the wall or the floor.

16. The method of claim 10, wherein the generating includes resizing one of the elements based on the parametric information.

17. The method of claim 10, wherein the generating includes determining a clearance between two of the elements, and wherein the routing one of the elements through another one of the elements is based on the clearance.

18. The method of claim 10, wherein the generating includes applying a set of standards to the plurality of elements.

* * * * *